March 21, 1950 C. W. SINCLAIR 2,501,587
WHEEL
Filed Dec. 6, 1948
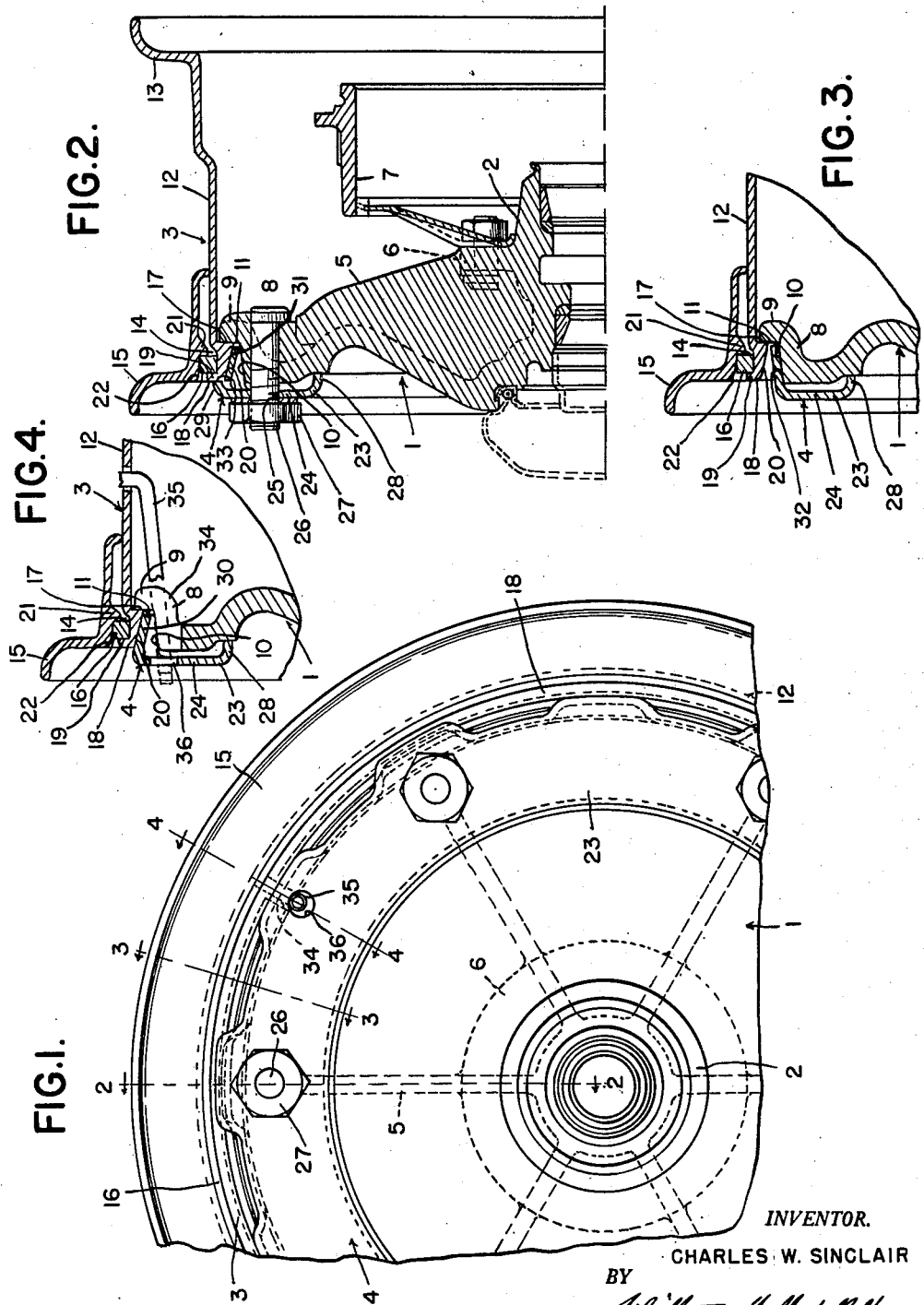
INVENTOR.
CHARLES W. SINCLAIR
BY
*Whittemore Hulbert & Belknap*
ATTORNEYS Patented Mar. 21, 1950

2,501,587

UNITED STATES PATENT OFFICE 2,501,587

WHEEL

Charles W. Sinclair, Detroit, Mich., assignor to Kelsey-Hayes Wheel Company, Detroit, Mich., a corporation of Delaware Application December 6, 1948, Serial No. 63,770

5 Claims. (Cl. 301—22)

The invention relates to wheels and refers more particularly to wheels of the demountable rim type.

The invention has for one of its objects to provide an improved construction of wheel having an improved means for detachably securing the rim to the wheel body.

The invention has for other objects to so construct the wheel that the rim is positively aligned on the wheel body to rotate parallel to the plane of rotation of the wheel body and to so construct the wheel that the rim is centered on the wheel body.

The invention has for a further object to provide an improved means for mounting the rim on the wheel body.

With these and other objects in view, the invention resides in the novel features of construction and combinations and arrangements of parts as more fully hereinafter set forth.

In the drawings:

Figure 1 is a side elevation of a wheel embodying the invention;

Figures 2, 3 and 4 are cross sections on the lines 2—2, 3—3 and 4—4 respectively of Figure 1.

As illustrated in the drawings, the wheel comprises the wheel body 1, the hub 2, the demountable tire carrying rim 3 and the means 4 for detachably securing the rim on the wheel body. The wheel body and hub in the present instance are cast in one piece with the wheel body extending generally radially outwardly from the outboard end of the wheel hub and reinforced by the angularly spaced radially extending ribs 5. 6 is a fixed flange extending radially from the wheel hub intermediate its ends and adapted to have secured to its inboard side the web of the brake drum 7.

The wheel body is formed with the peripheral flange 8 extending generally axially in an inboard direction and with the radial flange 9 extending radially outwardly from the inboard edge of the peripheral flange. The peripheral flange has the circumferentially extending radially outer surface 10 which preferably flares in an inboard direction and the radial flange 9 has at its outboard side the substantially radial surface 11 forming a shoulder, the path of rotation of which is at right angles to the axis of the wheel body.

The rim 3 comprises the endless annular base member 12 having the radial tire retaining flange 13 at its inboard edge and the radially outwardly opening gutter 14 at its outboard edge. The rim also comprises the endless annular tire retaining member 15 and the transversely split clamping ring 16. The gutter 14 of the annular base member has the substantially radial surface 17 facing in an inboard direction, the substantially radial surface 18 at the outboard side of the annular wall 19 of the gutter and the radially inner surface 20 between the surfaces 17 and 18 and flared from the former to the latter. The clamping ring in the operative position of the parts of the rim is located in the gutter 14 and abuts substantially radial stop surfaces formed on the wall 19 of the gutter and the endless radially inwardly extending bead 21 of the tire retaining member and this clamping ring also has wedging engagement with the tire retaining member, the latter having the radially inner surface 22 flared axially outwardly from the bead for engaging a correspondingly inclined surface on the latter.

For the purpose of securing the rim on the wheel body, I have provided the clamping ring 23, this ring being formed of sheet steel and generally channel shaped and having its base 24 provided with the circumferentially or angularly spaced holes 25 for the bolts 26 which are secured to the radially outer portion of the wheel body and are engaged by the nuts 27. The clamping ring has the radially inner flange 28 arranged to abut the wheel body and the radially outer flange 29 which is formed to clamp the rim against the substantially radial shoulder 11 of the wheel body and to also resiliently support the rim upon the radially outer surface 10 of the wheel body. More particularly, the radially outer flange 29 has the circumferentially spaced tapered rim seat portions 30 inclined at the same angle as and engaging the flared radially inner surface 20 of the rim, the circumferentially spaced tapered rim seat portions 31 also inclined at the same angle as and engaging the radially inner surface 20, the circumferentially spaced flared wheel body engaging portions 32 located between the rim seat portions 30 and 31 and inclined at substantially the same angle as and engaging the radially outer surface 10 of the wheel body and the substantially radial coplanar shoulders 33 for axially abutting the substantially radial surface 18 of the rim. The rim seat portions and wheel body engaging portions are offset axially inwardly relative to the shoulders and are in the nature of ribs with the rim seat portions offset axially outwardly from the wheel body engaging portions to provide for resiliency. The rim seat portions 31 and the shoulders 33 are sheared from each other. With this construction, the rim seat portions and wheel body engaging portions have a resilient wedging action with the wheel body and rim for yieldably supporting the rim upon the wheel body and permitting the shoulders 33 to engage the rim to force its inboard substantially radial surface against the substantially radial shoulder of the wheel body and thereby positively align the rim upon the wheel body so that the plane of rotation of the rim is at right angles to the axis of the wheel body.

The wheel body 1 is formed substantially midway between the bolts 26 with the axial slot 34 in its peripheral flange 8 and radial flange 9 for receiving the valve stem 35 of the tire, and the clamping ring 23 is formed with the opening 36 in its base 24 through which the valve stem extends in the operative position of the parts.

What I claim is:

1. A wheel comprising a wheel body having a circumferentially extending radially outer surface and a circumferentially extending substantially radial shoulder, a rim having a gutter formed with a substantially radial surface for abutting said shoulder, a second substantially radial surface and a flared radially inner surface between said substantially radial surfaces, and a ring for securing said rim to said wheel body having a flange formed with circumferentially spaced tapered rim seat portions for engaging said flared radially inner surface, circumferentially spaced wheel body engaging portions for engaging said radially outer surface and circumferentially spaced substantially radial shoulders for engaging said second substantially radial surface and forcing said first mentioned substantially radial surface into engagement with said first mentioned shoulder.

2. A wheel comprising a wheel body having a circumferentially extending radially outer surface and a circumferentially extending substantially radial shoulder, a rim having a gutter formed with a substantially radial surface for abutting said shoulder, a second substantially radial surface and a flared radially inner surface between said substantially radial surfaces, and a ring for securing said rim to said wheel body having a flange formed with circumferentially spaced tapered rim seat portions for engaging said flared radially inner surface, circumferentially spaced wheel body engaging portions for engaging said radially outer surface, circumferentially spaced substantially radial shoulders for engaging said second substantially radial surface and tapered rim seat portions axially beyond said last mentioned shoulders for engaging said flared radially inner surface.

3. A wheel comprising a wheel body having a circumferentially extending radially outer surface and a circumferentially extending substantially radial shoulder, a rim having axially spaced substantially radial surfaces and a flared radially inner surface, and a ring for securing said rim to said wheel body having a flange formed with circumferentially spaced substantially radial shoulders for engaging one of said first mentioned substantially radial surfaces and forcing the other of said first mentioned substantially radial surfaces against said first mentioned shoulder, said flange also being formed with circumferentially spaced tapered rim seat portions for engaging said flared radially inner surface and circumferentially spaced wheel body engaging portions for engaging said radially outer surface.

4. A wheel comprising a wheel body having a circumferentially extending radially outer surface and a circumferentially extending substantially radial shoulder at the inboard end of said surface, a rim having axially spaced substantially radial surfaces and a flared radially inner surface between said substantially radial surfaces and a channel shaped ring for securing said rim to said wheel body having a radially outer flange formed with circumferentially spaced substantially radial shoulders for engaging one of said first mentioned substantially radial surfaces and forcing the other of said first mentioned substantially radial surfaces against said shoulder, said flange also being formed with circumferentially spaced tapered rim seat portions spaced radially outwardly from said radially outer surface and engaging said flared radially inner surface, certain of said tapered rim seat portions extending axially beyond said flange shoulders, said flange further being formed with portions circumferentially between said tapered rim seat portions and spaced radially inwardly from said flared radially inner surface for engaging said radially outer surface.

5. A ring for securing a demountable rim to a wheel body having a body formed with transverse bolt holes and a transverse flange at one edge of said body, said flange being provided with circumferentially spaced coplanar shoulders, circumferentially spaced tapered rim seat portions and wheel body engaging portions between said tapered rim seat portions, said tapered rim seat portions being radially inwardly offset from said shoulders and said wheel body engaging portions being radially inwardly offset from said tapered rim seat portions.

CHARLES W. SINCLAIR.

No references cited.